United States Patent
Khatter et al.

(10) Patent No.: US 12,469,353 B2
(45) Date of Patent: Nov. 11, 2025

(54) SYSTEM AND METHOD FOR AUTOMATIC CONFIGURATION OF SELF-SERVICE KIOSKS

(71) Applicant: Vendekin Technologies Private Limited, Pune (IN)

(72) Inventors: Aroon Ashish Khatter, Pune (IN); Ajit Sukumaran Nair, Pune (IN); Habiballa G. Rajbar, Pune (IN)

(73) Assignee: VENDEKIN TECHNOLOGIES PRIVATE LIMITED, Pune (IN)

( * ) Notice: Subject to any disclaimer, the term of this patent is extended or adjusted under 35 U.S.C. 154(b) by 500 days.

(21) Appl. No.: 18/102,978

(22) Filed: Jan. 30, 2023

(65) Prior Publication Data
US 2023/0316847 A1  Oct. 5, 2023

(30) Foreign Application Priority Data
Jan. 31, 2022 (IN) .............................. 202221005258

(51) Int. Cl.
*G07F 9/00* (2006.01)
*G06Q 20/18* (2012.01)

(52) U.S. Cl.
CPC ............ *G07F 9/006* (2013.01); *G06Q 20/18* (2013.01); *G07F 9/001* (2020.05); *G07F 9/002* (2020.05)

(58) Field of Classification Search
CPC .......... G07F 9/001; G07F 9/002; G07F 9/006; G06Q 20/18; G06Q 20/2376
See application file for complete search history.

(56) References Cited

U.S. PATENT DOCUMENTS

| | | | |
|---|---|---|---|
| 8,631,093 B2 | 1/2014 | Defosse | |
| 10,304,057 B1 | 5/2019 | Powell et al. | |
| 11,296,721 B1 * | 4/2022 | Yang | G07F 9/002 |
| 2024/0354729 A1 * | 10/2024 | Mattison | G06Q 20/1085 |

FOREIGN PATENT DOCUMENTS

CN  104299138 A  1/2015

\* cited by examiner

*Primary Examiner* — Timothy R Waggoner
(74) *Attorney, Agent, or Firm* — Jason A. Smith; Shumaker, Loop & Kendrick, LLP

(57) ABSTRACT

A system and method for automatic configuration of a self-service kiosk. The key aspect of the configuration of the self-service kiosk is to autoconfigure the unattended self-service kiosk enabled by a hardware and a vending machine software (VMS) of the system. The system and method reduce the time for operator, business user to install and manage the self-service kiosk. The system uses the data obtained from the self-service kiosks via a data file to automatically configure these self-service kiosks. Once the self-service kiosk is configured the same is displayed back to the operator/business user who is configuring the self-service kiosk on their mobile using the hardware and vending machine software (VMS) so that the consumers can start using the self-service kiosk immediately after configuration.

10 Claims, 5 Drawing Sheets

SYSTEM AND METHOD FOR AUTOMATIC CONFIGURATION OF SELF-SERVICE KIOSKS

CROSS-REFERENCE TO RELATED APPLICATIONS AND PRIORITY

The present application claims priority from Indian Patent Application no. 202221005258 filed on 31 Jan. 2022, incorporated herein by a reference.

TECHNICAL FIELD

The present disclosure relates to a method for automatic configuration of a self-service kiosks using a user device. More particularly, the present disclosure relates to planogram automation and key matrix automation for converting legacy self-service kiosks into a smart self-service kiosk for automatically dispense products without requiring physically pressing of the keys by the user on the self-service kiosk.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Now-a-days self-service kiosks are used for the contactless sale of any commodities which speed up the process and improve the customer experience. The planogram in these self-service kiosks generally contains an information corresponding to a set of products available for vending. The planogram helps the user to select the product effortlessly resulting in shorter shopping times and more purchases. The planogram used in the self-service kiosks is generally used to map the products to be dispensed from the available set of products along with their pricing. Therefore, the planogram must be updated with respect to the stock available and the availability of products on a periodic basis. In the existing art, the configuration of planogram is usually done manually by an operator of the self-service kiosks. However, the manual configuration of the self-service kiosks is time consuming and subject the multiple errors.

Therefore, there is a long felt need in the art for the autoconfiguration of the unattended self-service kiosk over the mobile application so that the user can start using the self-service kiosk immediately resulting into the planogram automation and the key matrix automation.

SUMMARY

This summary is provided to introduce concepts related to planogram automation and key matrix automation for transforming a traditional self-service kiosk into an autoconfigured self-service kiosk. This summary is not intended to identify essential features of the claimed subject matter nor is it intended for use in determining or limiting the scope of the claimed subject matter.

A system and methods for autoconfiguration of the self-service kiosk enables key features like fast configuration, reduced time for operators to install and manage the self-service kiosk, increased efficiency in overall management of the self-service kiosk and operation scaling and has the ability to convert the existing self-service kiosk into the autoconfigured self-service kiosk.

A system for autoconfiguration of the self-service kiosk for automated dispensing of products may comprises a cloud server which may receive a data file from the self-service kiosk. Further the data file may be analysed to extract the metadata from the data file. The cloud server further may receive an image of a keypad of the self-service kiosk. The keypad image may be further processed to determine if the keypad is registered with the cloud server or not. If the self-service kiosk is not registered, then the said system may register the self-service kiosk over a mobile application. After successful registration of the self-service kiosk, the mobile application may be updated with an information corresponding to a set of products associated with the self-service kiosk, wherein the information corresponding to a set of products may be extracted from the metadata.

The system may use a custom hardware and its vending machine software (VMS) in order to autoconfigure the self-service kiosk. Once the self-service kiosk is configured the same may be displayed back to the operator/business user who is configuring the self-service kiosk on their mobile using the hardware and the vending machine software (VMS). If the data file obtained from the self-service kiosk has product information, then the vending machine software (VMS) may be enabled with the capability to automatically configure the products. This is done so that consumers can start using the self-service kiosk immediately after configuration.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
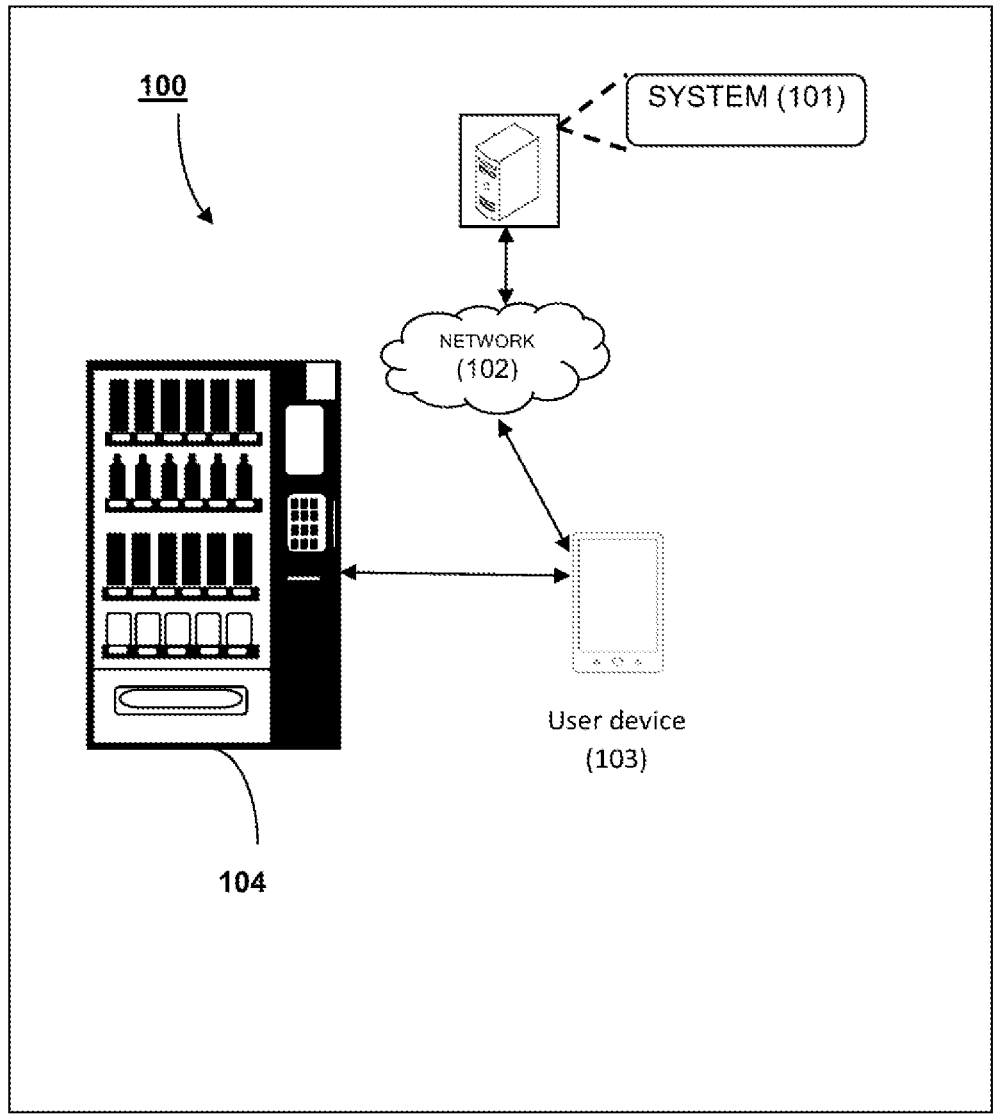
FIG. 1 illustrates a self-service kiosk with a QR code for the autoconfiguration of the planogram, in accordance with an embodiment of the present subject matter.

Referring to FIG. 1, a self-service kiosk (104) which is to be autoconfigured by using a mobile application installed on a user device (103) is illustrated, in accordance with an embodiment of the present subject matter. The self-service kiosk (104) may be any type of machine for dispensing products or provisioning services based on inputs received from a user.

As shown in FIG. 1, the user device (103) may be used for scanning a QR code displayed on the self-service kiosk (104) which may redirect the operator (hereafter referred to as user) to the mobile application installed on the user device (103). The scanning of the QR code may enable the user to know whether the self-service kiosk (104) is configured or not. The autoconfiguration data of the self-service kiosk (104) may be obtained by the vending machine software (VMS) which may be visible on the mobile application.

Figure 2:
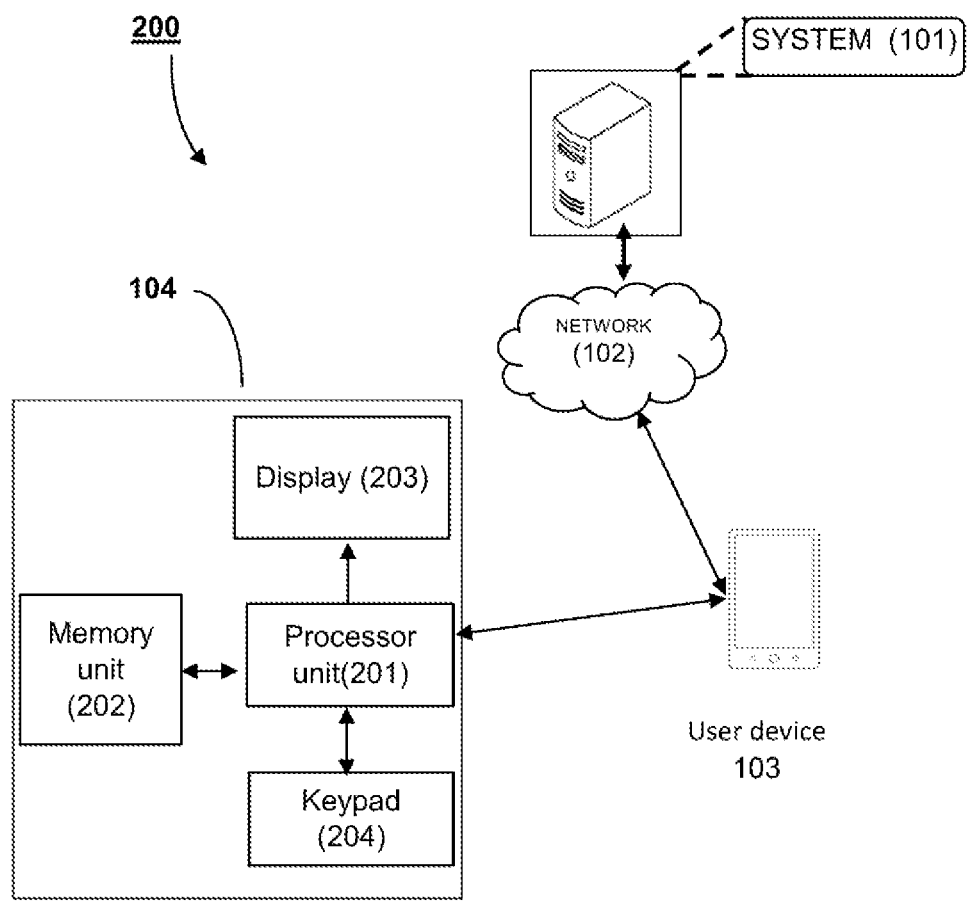
FIG. 2 illustrates a block diagram representing components of the self-service kiosk, in accordance with an embodiment of the present subject matter.

Referring to FIG. 2, the block diagram (200) showing the components of the self-service kiosk (104) is depicted, in accordance with an embodiment of the present subject matter. As shown in FIG. 2, the self-service kiosk (104) comprises a display unit (203), a processor unit (201), a keypad (204) and a memory unit (202). The processor unit (201) may be electronically coupled with the memory unit (202) along with the display (203) and keypad (204). The user device (103) may be communicatively coupled with a system (101) via a network (102). The processor unit (201) is configured to execute programmed instructions stored in the memory unit (202). The processor unit (201) is configured to execute programmed instructions in order to establish communication between the processor unit (201) with the user device (103) located within a predefined distance from the self-service kiosk (104).

Figure 3:
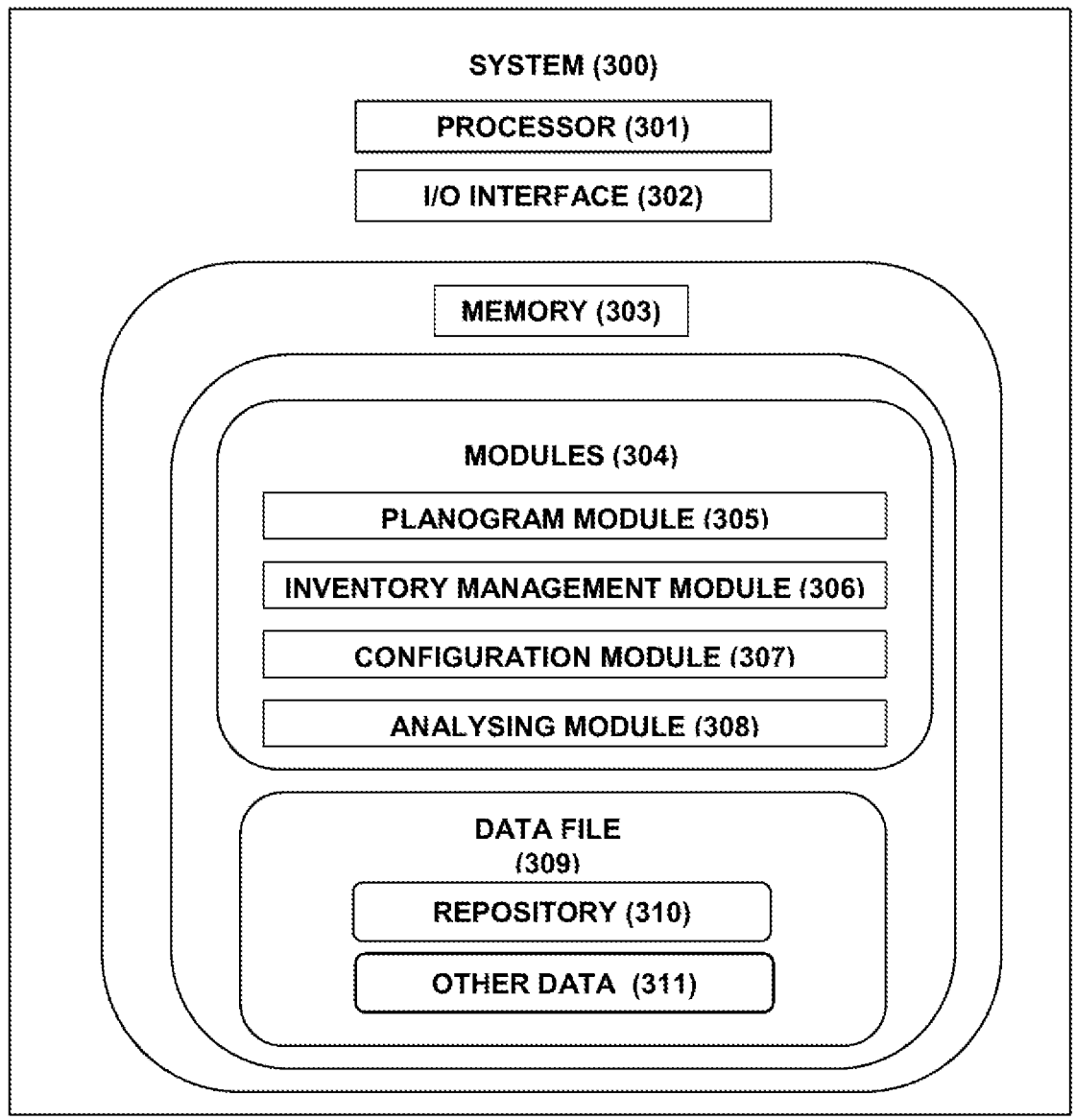
FIG. 3 illustrates a system for the management of the self-service kiosk, in accordance with an embodiment of the present subject matter.

Referring to FIG. 3, the system (101) for the self-service kiosk (104) is illustrated, in accordance with an embodiment of the present subject matter. As shown in FIG. 3, the system (101) may be configured to display planogram on the user device (103), wherein the planogram may consist of the information related to plurality of the products available for the dispensing in the self-service kiosk (104). The system (101) may enable it to autoconfigure the planogram which may dynamically control the pricing and stock information of the self-service kiosk (104).

Here, the data obtained from the self-service kiosk (104) via a data file may be used to automatically configure the self-service kiosk (104). The solution uses the custom hardware and its vending machine software (VMS) to enable the autoconfiguration. The data file that is obtained from the self-service kiosk (104) may be captured by the hardware. Here data file can be a data exchange file (DEX file) which may contain information related to serial number and model number of the self-service kiosk, product identifier, product list, product price, product image, cash and cashless transaction details, etc. This data file may then push to the cloud without the self-service kiosk (104) plugged to the internet. Further, the mobile application may push this data file to the vending machine software (VMS) running in the public cloud. Further, the vending machine software (VMS) may slice the data file obtained and starts the autoconfiguration of the self-service kiosk (104) which may be then visible on the private labelled applications. The present invention may enable millions of the self-service kiosk (104) to be configured simultaneously. Once the self-service kiosk (104) is configured, the same is displayed back to the user who is configuring the self-service kiosk (104) on their respective communicative device, e.g., a smartphone. If the data file obtained from the self-service kiosk (104) has product information, then the vending machine software (VMS) may have the capability to automatically configure the products along with images. This is done so that consumers can start using the self-service kiosk (104) immediately. In case the product information is not mapped then the operator, business user can start configuring the products and refill the self-service kiosk (104) in one go.

Figure 4:
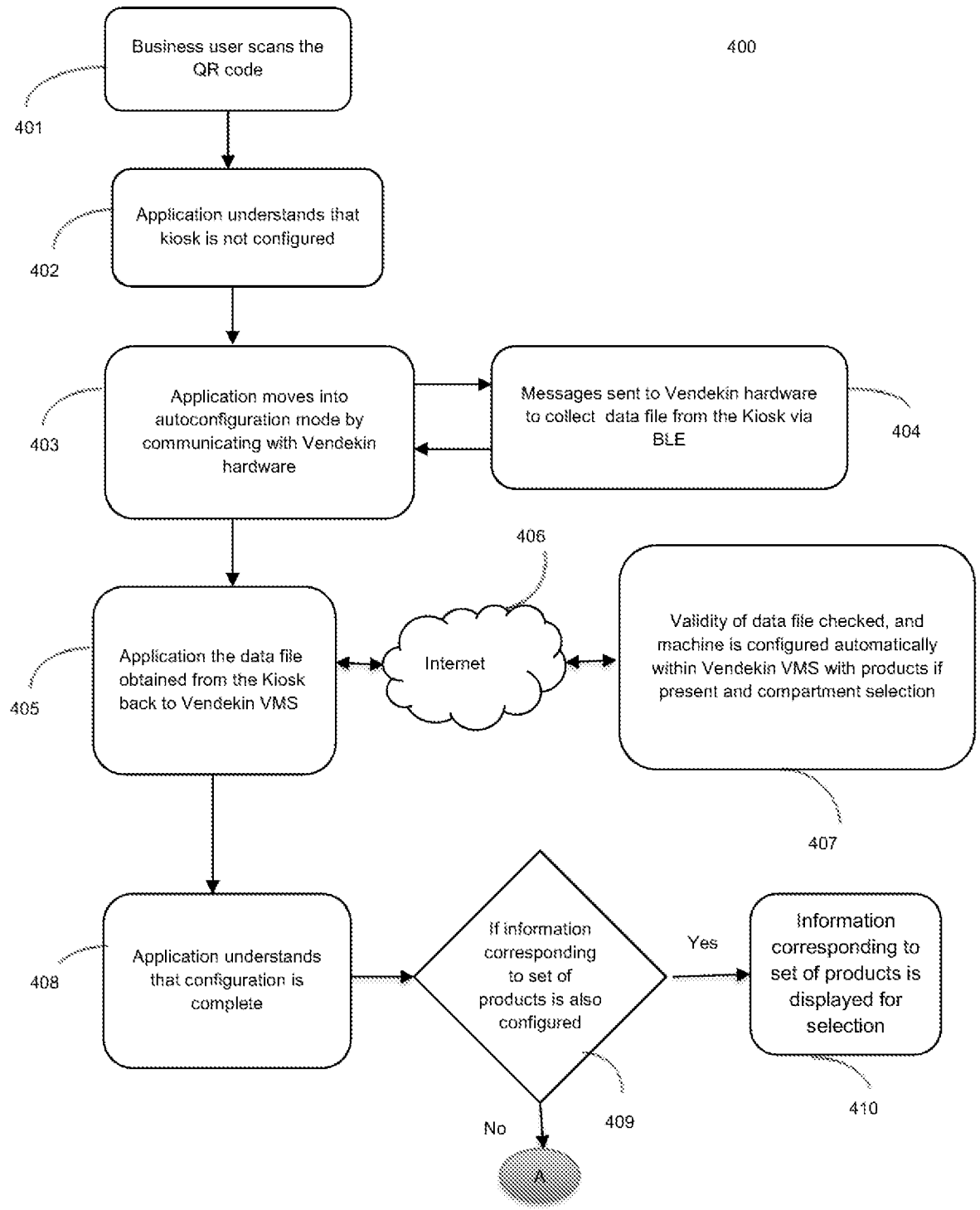
FIG. 4 illustrates a flow-diagram for autoconfiguration of the self-service kiosk for automated dispensation, in accordance with an embodiment of the present subject matter.

Referring to FIG. 4, the flow-diagram 400 for autoconfiguration of the self-service kiosks (104) for automated dispensing is depicted, in accordance with an embodiment of the present subject matter.

At step 401 the operator/business user may scans the QR code on the self-service kiosk (104) which may redirect the operator/business user to the mobile application.

At step 402, the mobile application may determine whether the self-service kiosk (104) is configured or not.

At step 403 if the self-service kiosk (104) is not configured, then the mobile application may switch into auto configuration mode by communicating with the hardware in the self-service kiosk (104).

At step 404, the hardware may transmit the data file from the self-service kiosk (104) to the mobile application via Bluetooth Low Energy (BLE).

At step 405, the data file obtained from the self-service kiosk (104) may be sent back to the vending machine software (VMS) running in the public cloud.

At step 407, the validity of the data file may be checked, and the self-service kiosk (104) is configured automatically within the vending machine software (VMS) with products if present and compartment selection using the internet (406).

At step 408, the mobile application determines if the configuration is complete.

At step 409, if the configuration is complete, the mobile application may determine if the information corresponding to a set of products is also configured.

At step 410, if the information corresponding to a set of products is also configured, it may made available for the operator/business user who scan the QR code at the self-service kiosk (104).

Figure 5:
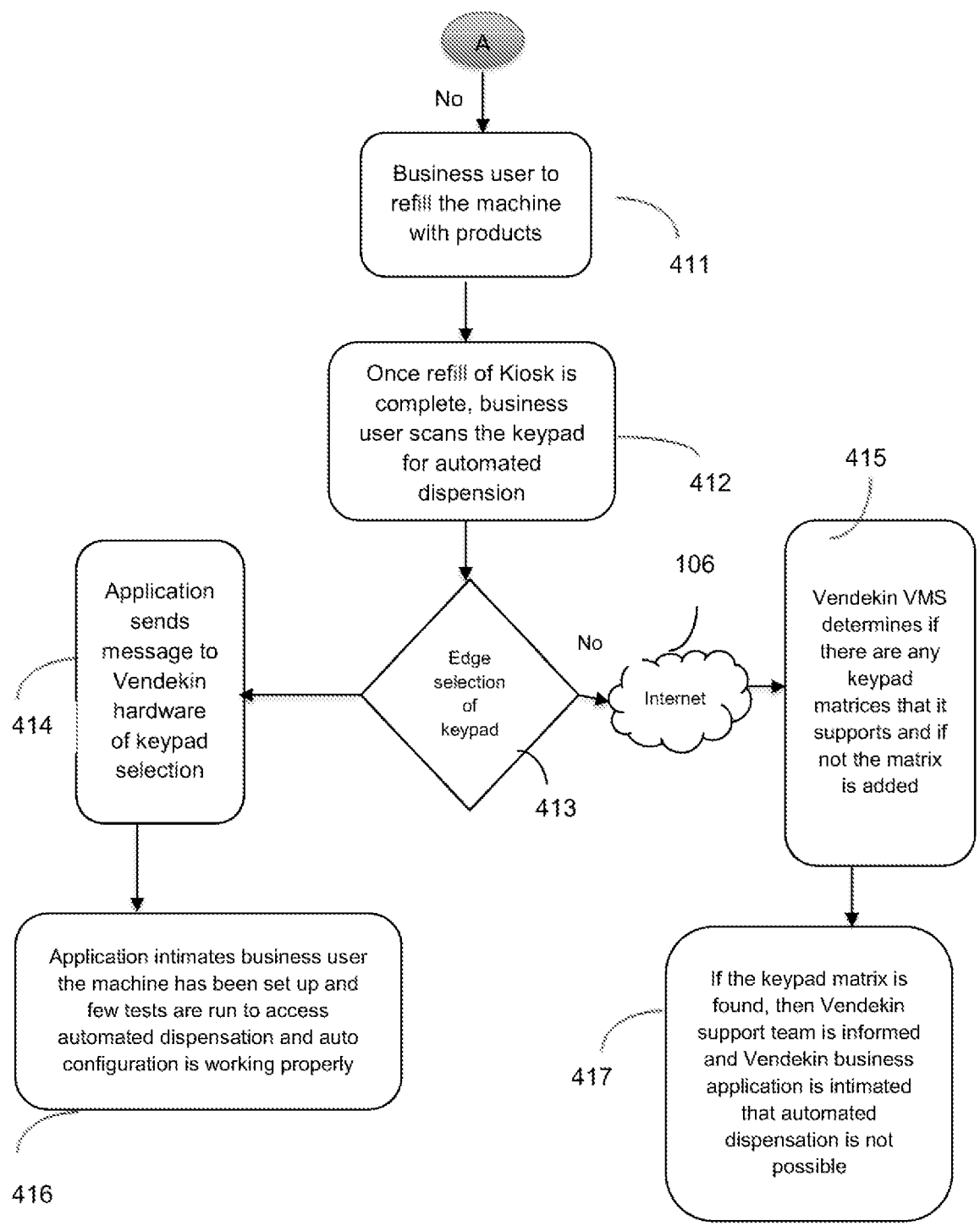
FIG. 5 illustrates a flow-diagram for autoconfiguration of the self-service kiosk for automated dispensation, in accordance with an embodiment of the present subject matter.

As shown in FIG. 5, at step 411, if the information corresponding to a set of products is not configured, the operator/business user of the self-service kiosk (104) may refill the self-service kiosk (104) with the products to be dispensed.

At step 412, once the refill of the kiosk is complete, the business user may scan the keypad for automated dispensation using the user device (102), also termed as Edge selection.

The mobile application may use artificial intelligence to determine the kind of keypad being used on the self-service kiosk (104).

At step 413, the user device (102) may attempt edge selection of the keypad.

At step 414, if the edge selection is possible, the mobile application may send a message to the hardware confirming keypad selection.

At step 416, the mobile application notifies the operator/business user that the self-service kiosk (104) has been set up. Further, a few tests may be run to access automated dispensation and confirm if the auto configuration is working appropriately.

At step 415, if the edge selection is not possible at step 413, the vending machine software (VMS) may determine if there are any keypad matrices that it supports. If no keypad matrix is identified, the vending machine software (VMS) may add the matrix.

At step 417, if a new keypad matrix is found, then a support team may be informed and the setup process for auto dispensing of products may be terminated as auto dispensing of products is not possible.

The foregoing description shall be interpreted as illustrative and not in any limiting sense. A person of ordinary skill in the art would understand that certain modifications could come within the scope of this disclosure. The embodiments, examples and alternatives of the preceding paragraphs or the description and drawings, including any of their various aspects or respective individual features, may be taken independently or in any combination. Features described in connection with one embodiment are applicable to all embodiments unless such features are incompatible.

The invention claimed is:

1. A system for autoconfiguration of a self-service kiosk for automated dispensing of products, the system comprising:
   a cloud server, wherein the cloud server is configured for:
   receiving a data file from the self-service kiosk,
   parsing the data file to extract metadata from the data file,
   receiving an image of a keypad of the self-service kiosk,
   processing the image to determine if the keypad is registered with the cloud server,
   registering the self-service kiosk over a mobile application, when the keypad is registered with the cloud server, wherein upon registration, the mobile application is updated with an information corresponding to a set of products associated with the self-service kiosk, wherein the information corresponding to the set of products is extracted from the metadata.

2. The system as claimed in claim 1, wherein the cloud server is configured to update a keypad matrix database to register the keypad when the keypad is not registered with the cloud server.

3. The system as claimed in claim 1, wherein the data file is captured by a self-service kiosk's hardware and pushed to a vending machine software (VMS) running on the cloud server, wherein the vending machine software (VMS) is configured to slice and dice the data file and autoconfigure the self-service kiosk.

4. The system as claimed in claim 1, wherein the self-service kiosk is visible on the mobile application after registration.

5. The system as claimed in claim 1, wherein the hardware transmits the data file from the self-service kiosk to the mobile application via BLE (Bluetooth Low Energy).

6. A method for autoconfiguration of a self-service kiosk for automated dispensing of products, the method comprising steps of:
   receiving, by a cloud server, a data file from the self-service kiosk,
   parsing, by the cloud server, the data file to extract metadata from the data file,
   receiving, by the cloud server, an image of a keypad of the self-service kiosk,
   processing, by the cloud server the keypad image to determine if the keypad is registered with the cloud server,
   registering the self-service kiosk over a mobile application, when the keypad is registered with the cloud server, wherein upon registration, the mobile application is updated with a information corresponding to a set of products associated with the self-service kiosk, wherein the information corresponding to a set of products is extracted from the metadata.

7. The method as claimed in claim 6, wherein the cloud server is configured to update a keypad matrix database to register the keypad when the keypad is not registered with the cloud server.

8. The method as claimed in claim 6, wherein the data file is captured by a self-service kiosk's hardware and pushed to a vending machine software (VMS) running on the cloud server, wherein the vending machine software (VMS) is configured to slice and dice the data file and autoconfigure the self-service kiosk.

9. The method as claimed in claim 6, wherein the self-service kiosk is visible on the mobile application after registration.

10. The method as claimed in claim 6, wherein the hardware transmits the data file from the self-service kiosk to the mobile application via BLE (Bluetooth Low Energy).

* * * * *